United States Patent
Gauthier (10) Patent No.: US 10,417,520 B2
(45) Date of Patent: Sep. 17, 2019

(54) METHOD AND SYSTEM FOR AUTOMATICALLY DETECTING A MISALIGNMENT DURING OPERATION OF A MONITORING SENSOR OF AN AIRCRAFT

(71) Applicant: Airbus Operations S.A.S., Toulouse (FR)

(72) Inventor: Stephane Gauthier, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 181 days.

(21) Appl. No.: 14/965,124

(22) Filed: Dec. 10, 2015

(65) Prior Publication Data

US 2016/0171700 A1 Jun. 16, 2016

(30) Foreign Application Priority Data

Dec. 12, 2014 (FR) .................................. 14 62316

(51) Int. Cl.
*G06T 7/00* (2017.01)
*G06T 7/20* (2017.01)
(Continued)

(52) U.S. Cl.
CPC .............. *G06K 9/52* (2013.01); *G06K 9/6201* (2013.01); *G06T 7/246* (2017.01); *G06T 7/33* (2017.01);
(Continued)

(58) Field of Classification Search
CPC .......... G06K 9/52; G06K 9/6201; G06T 7/80; G06T 7/246; G06T 7/73; G06T 7/33; G06T 7/60; H04N 7/185
See application file for complete search history.

(56) References Cited

U.S. PATENT DOCUMENTS 5,995,681 A * 11/1999 Lee .................. G01C 11/02
356/139.03
7,337,650 B1 * 3/2008 Preston .................. B60W 40/11
73/1.38
(Continued)

FOREIGN PATENT DOCUMENTS

EP 2665037 A1 11/2013

OTHER PUBLICATIONS

Smith et al., "IMU and Digital Aerial Camera Misalignment Calibration", The University of Nottingham (Year: 2006).*
(Continued)

*Primary Examiner* — Gims S Philippe
*Assistant Examiner* — Stefan Gadomski
(74) *Attorney, Agent, or Firm* — Lorenz & Kopf LLP (57) ABSTRACT

A detection system comprises an analysis unit for analyzing successive images generated by a monitoring sensor to determine in an image a position of an axis representative of the displacement of the aircraft between two successive images, the so-called real position, a computation unit for computing, on the basis of data relating to a displacement of an aircraft between the generations of these two images and of the positioning of the monitoring sensor on the aircraft, a position in an image of an axis representative of the displacement of the aircraft, the theoretical position, an estimation unit for estimating the angular disparity between the real position and the theoretical position, and a comparison unit for comparing this angular disparity with at least one predefined tolerance value so as to detect a misalignment when this angular disparity is greater than this tolerance value.

13 Claims, 4 Drawing Sheets

(51) Int. Cl.
  *G06T 7/60* (2017.01)
  *G06K 9/62* (2006.01)
  *G06K 9/52* (2006.01)
  *H04N 7/18* (2006.01)
  *G06T 7/80* (2017.01)
  *G06T 7/33* (2017.01)
  *G06T 7/73* (2017.01)
  *G06T 7/246* (2017.01)

(52) U.S. Cl.
  CPC ............... *G06T 7/60* (2013.01); *G06T 7/73* (2017.01); *G06T 7/80* (2017.01); *H04N 7/185* (2013.01); *G06T 2207/10016* (2013.01); *G06T 2207/20228* (2013.01); *G06T 2207/30252* (2013.01)

(56) References Cited

U.S. PATENT DOCUMENTS

| | | | | |
|---|---|---|---|---|
| 7,382,448 B1* | 6/2008 | Hedrick | | G01B 21/26 356/139.01 |
| 7,602,415 B2* | 10/2009 | von Flotow | | G01C 11/025 348/113 |
| 7,605,774 B1* | 10/2009 | Brandt | | G02B 27/01 340/972 |
| 7,768,631 B1* | 8/2010 | Rovinsky | | B64G 1/1021 356/139.01 |
| 2003/0044085 A1* | 3/2003 | Dial, Jr. | | G01C 11/02 382/293 |
| 2003/0048357 A1* | 3/2003 | Kain | | B64D 47/08 348/144 |
| 2003/0098972 A1* | 5/2003 | McMillan | | G01B 11/272 356/139.03 |
| 2004/0008250 A1* | 1/2004 | Thal | | G03B 35/08 348/42 |
| 2004/0030519 A1* | 2/2004 | Messina | | G01B 11/272 702/94 |
| 2004/0257441 A1* | 12/2004 | Pevear | | B64D 47/08 348/144 |
| 2006/0291744 A1* | 12/2006 | Ikeda | | G06K 3/00 382/275 |
| 2008/0007619 A1* | 1/2008 | Shima | | G06T 7/80 348/118 |
| 2008/0031514 A1* | 2/2008 | Kakinami | | G06T 7/80 382/154 |
| 2009/0299684 A1* | 12/2009 | Imanishi | | G06K 9/00791 702/150 |
| 2010/0013927 A1* | 1/2010 | Nixon | | G01C 11/06 348/144 |
| 2010/0245592 A1* | 9/2010 | Inui | | G06T 7/80 348/187 |
| 2011/0010026 A1* | 1/2011 | Jensen | | G01C 11/00 701/3 |
| 2011/0090337 A1* | 4/2011 | Klomp | | G01C 11/025 348/144 |
| 2011/0115922 A1* | 5/2011 | Shimizu | | G06T 7/80 348/188 |
| 2012/0224058 A1* | 9/2012 | Benning | | B64D 47/08 348/144 |
| 2012/0257050 A1* | 10/2012 | Simon | | G01S 11/12 348/135 |
| 2012/0294537 A1* | 11/2012 | Wallace | | G06K 9/3216 382/201 |
| 2012/0314068 A1* | 12/2012 | Schultz | | G06T 1/0007 348/144 |
| 2012/0320203 A1* | 12/2012 | Liu | | G01C 11/04 348/144 |
| 2013/0033598 A1* | 2/2013 | Milnes | | G01S 19/49 348/144 |
| 2013/0307982 A1* | 11/2013 | Kawai | | G06T 7/80 348/148 |
| 2014/0297069 A1* | 10/2014 | Landes | | E01B 27/02 701/19 |
| 2014/0300736 A1* | 10/2014 | Reitinger | | G06T 7/80 348/144 |
| 2014/0334668 A1* | 11/2014 | Saund | | G06T 7/20 382/103 |
| 2015/0051757 A1* | 2/2015 | Cox | | B64D 45/00 701/3 |
| 2015/0161801 A1* | 6/2015 | Schwartz | | F41G 3/22 348/147 |
| 2015/0348264 A1* | 12/2015 | Yoon | | B64G 1/244 348/117 |

OTHER PUBLICATIONS

French Patent Office, French Search Report for French Patent Application No. 1462316 dated Nov. 4, 2015.
Herdtweck, Christian, et al, "Monocular Heading Estimation in Non-Stationary Urban Environment", Multisensor Fusion and Integration for Intelligentsystems (MFI), 2012 IEEE Conference on, IEEE, Sep. 13, 2012, pp. 244-250.
Guerrero, J.J., et al, "Uncalibrated vision based on lines for robot navigation", Mechatronics, Pergamon Press, Oxford, GB, vol. 11, No. 6, Sep. 1, 2001, pp. 759-777.
Woelk, F., et al, "A monocular image based intersection assistant", Intelligent Vehicles Symposium, 2004 IEEEPARMA, Italy, Jun. 14, 2004, pp. 286-291.
Van Leeuwen, M. B., et al,"Motion Estimation with a mobile camera for traffic applications", Intelligent Vehicles Symposium, Oct. 3, 2000, pp. 58-63.

* cited by examiner

METHOD AND SYSTEM FOR AUTOMATICALLY DETECTING A MISALIGNMENT DURING OPERATION OF A MONITORING SENSOR OF AN AIRCRAFT

CROSS-REFERENCE TO RELATED APPLICATION

This application claims priority to French Patent Application No. 1462316, filed Dec. 12, 2014, which is incorporated herein by reference in its entirety.

TECHNICAL FIELD

The embodiments described herein relate to a method and a system for automatically detecting a misalignment during operation of a monitoring sensor of an aircraft, in particular of a transport airplane.

BACKGROUND

It is known that a modern aircraft is equipped with systems (or sensors) for imaging (or imagers) which provide pilots with data from monitoring the environment of the aircraft, named hereinafter "monitoring sensors". Such a monitoring sensor may relate especially to: a radar which provides an image of obstacles or of environmental conditions existing ahead of the aircraft; an enhanced vision system, EVS, comprising an infrared camera which provides the pilots of the aircraft with an enhanced image of a zone ahead of the aircraft under degraded visual condition; and a rolling camera which offers the pilots an exterior view in front of the aircraft to aid it with piloting on the ground.

It is known that the reliability of the information provided by such a monitoring sensor is directly related to its alignment according to a predetermined position. In particular the image of the EVS enhanced vision system, projected onto a head-up display, HUD, must for example be perfectly superimposed on the real image seen by transparency through this head-up display; the radar must carry out a detection in the axis of the aircraft; and the rolling camera must be perfectly aligned with the axis of the aircraft.

The alignment of a monitoring sensor along a predetermined axis tied to the aircraft is fixed during its installation on the aircraft final assembly line.

However, during the life of the aircraft, an event such as an impact with an external object for example, can lead to a misalignment of the monitoring sensor, either directly, or indirectly via the displacement of a structure or structural part which carries the monitoring sensor.

By misalignment is meant a shift of the line of sight of the monitoring sensor, according to which the latter produces images, with respect to a predetermined direction taken into account as reference.

Hence, it is necessary, or at the very least particularly useful, to be able to detect on an aircraft the misalignment of a monitoring sensor during operation, so as not to be induced into error and to have reliable information.

SUMMARY

The embodiments relate to a method for automatically detecting a misalignment during operation of a monitoring sensor built into an aircraft, the monitoring sensor being able to generate images of the external environment of the aircraft, which makes it possible to carry out particularly reliable and effective detection.

According to the embodiment, the method comprises successive steps comprising, during operation: a) analyzing a plurality of successive images generated by the monitoring sensor so as to determine, in at least one first of the images, a position, the so-called real position, of an axis representative of the displacement of the aircraft between the first image and a second image; b) acquiring from systems onboard the aircraft, data relating to the displacement of the aircraft between an instant of generation of the first image and an instant of generation of the second image; c) computing on the basis of these data and of the positioning of the monitoring sensor on the aircraft, a position in the first image of an axis representative of the displacement of the aircraft, the so-called theoretical position; d) estimating the angular disparity between the real position and the theoretical position of the axis representative of the displacement of the aircraft; and e) comparing this angular disparity with at least one predefined value so as to detect a misalignment when this angular disparity is greater than the predefined value.

Thus, an effective method is obtained for automatically detecting during operation (that is to say while the aircraft is operational, in the course of a flight or when rolling on the ground) a misalignment of a monitoring sensor, on the basis of the analysis of images generated by the monitoring sensor and of data provided by onboard systems, especially systems for measuring the displacement and the attitude of the aircraft, as specified hereinbelow.

The crew of the aircraft can thus be informed of any misalignment of the monitoring sensor, and therefore know whether or not the information provided by the monitoring sensor is exact and reliable.

It will be noted that, within the framework of the present embodiment, the first image, on which the real position is especially computed, is in general generated chronologically after the other image (the so-called second image). It is however also conceivable that the first image be generated chronologically before the second image.

In a preferred embodiment, the method also comprises a step of transmitting, to at least one user system, the angular disparity estimated in step d), this angular disparity making it possible to quantify the misalignment of the monitoring sensor, and/or an item of information relating to a misalignment detected in step e).

Moreover, in an advantageous manner, step a) comprises analyzing the images generated by the monitoring sensor so as to select characteristic points; for each of the selected characteristic points, analyzing the images so as to determine the motion of each of these characteristic points; for the motion of each of the characteristic points, separating a first component of the motion, due to a displacement of the aircraft, from a second component of the motion, due to an inherent motion of an element to which the characteristic point belongs; and determining the real position of the axis representative of the displacement of the aircraft with the aid of the first components of the motion of the characteristic points.

According to various embodiments which can be taken together or separately: the analysis of the images, implemented in step a), is limited to at least one so-called zone of interest of the images; the analysis of the images, implemented in step a), is carried out solely for all the n successive images, n being an integer greater than 1; step a) comprises determining a so-called real position of a focus of expansion, illustrating the real position of the axis representative of the displacement of the aircraft, step c) comprises determining a so-called theoretical position of the focus of expansion, illustrating the theoretical position of the axis representative of the displacement of the aircraft, and step d) comprises estimating the disparity between the real position of the focus of expansion and the theoretical position of the focus of expansion; the method comprises a step of determining a confidence rating of the angular disparity estimated in step d); the method comprises a step of temporal filtering of the angular disparity estimated in step d).

The embodiments also relate to a system for automatically detecting a misalignment during operation of a monitoring sensor built into an aircraft, the monitoring sensor being able to generate images of the external environment of the aircraft.

According to the embodiment, the detection system comprises an analysis unit configured to analyze a plurality of successive images generated by the monitoring sensor so as to determine, in at least one first of the images, a position, the so-called real position, of an axis representative of the displacement of the aircraft between the first image and a second image; an acquisition unit configured to acquire from systems onboard the aircraft, data relating to the displacement of the aircraft between an instant of generation of the first image and an instant of generation of the second image; a computation unit configured to compute on the basis of these data and of the positioning of the monitoring sensor on the aircraft, a position in the first image of an axis representative of the displacement of the aircraft, the so-called theoretical position; an estimation unit configured to estimate the angular disparity between the real position and the theoretical position of the axis representative of the displacement of the aircraft; and a comparison unit configured to compare this angular disparity with at least one predefined value so as to detect a misalignment when this angular disparity is greater than the predefined value.

Advantageously, the detection system also comprises a transmission unit configured to transmit the angular disparity estimated by the estimation unit and/or an item of information relating to a misalignment detected by the comparison unit, to at least one user system such as a correction system for the angular disparity.

The present embodiment also relates to an aircraft, in particular a transport airplane, which is provided with a detection system such as that specified hereinabove.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
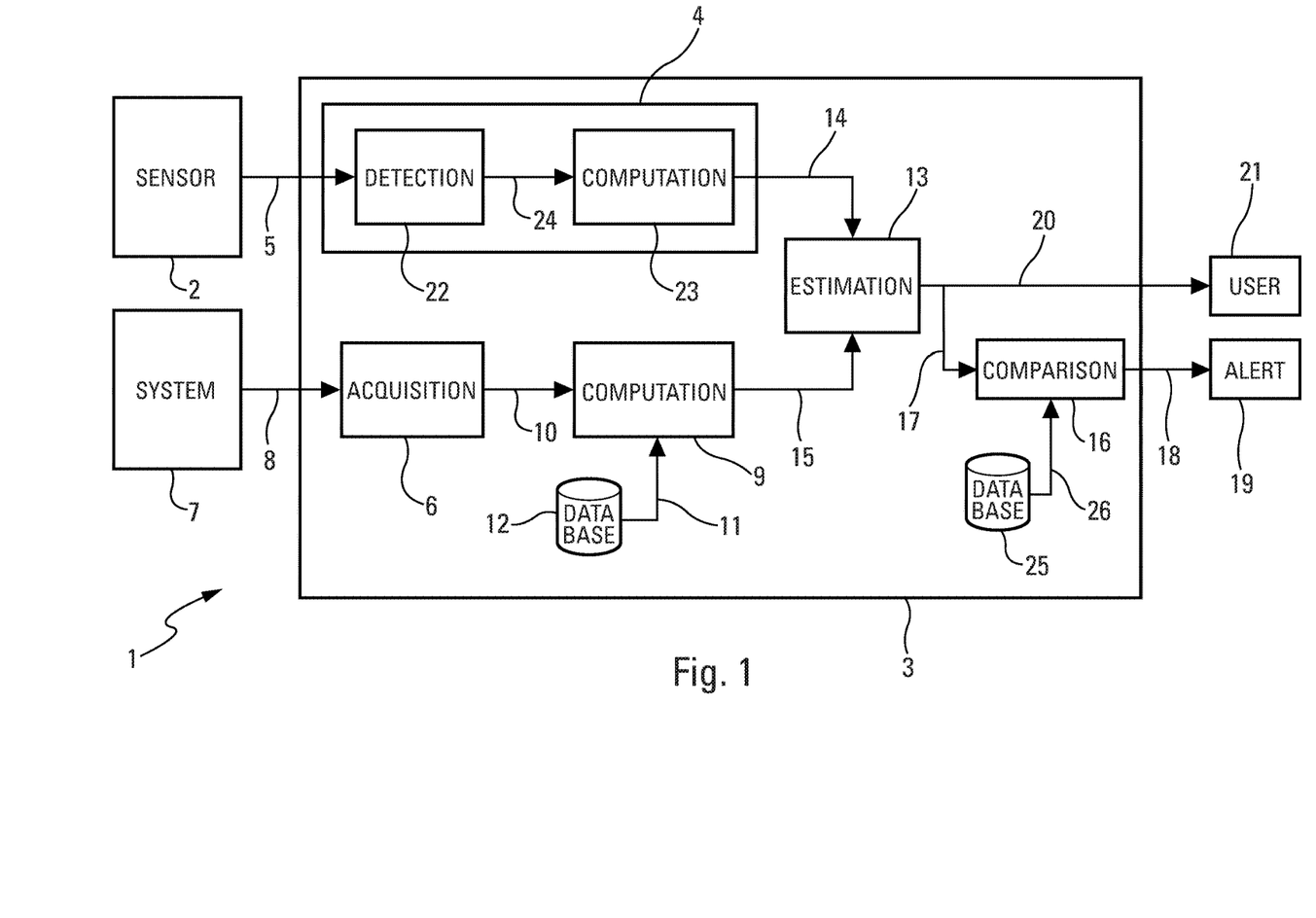
FIG. 1 is the schematic diagram of a particular embodiment of a system for automatically detecting a misalignment during operation of a monitoring sensor of an aircraft.

The system 1 represented schematically in FIG. 1 is a system for automatically detecting a misalignment during operation of a monitoring sensor "SENSOR" 2 (hereinafter "monitoring sensor 2") of an aircraft AC, for example of a transport airplane.

Figure 2:
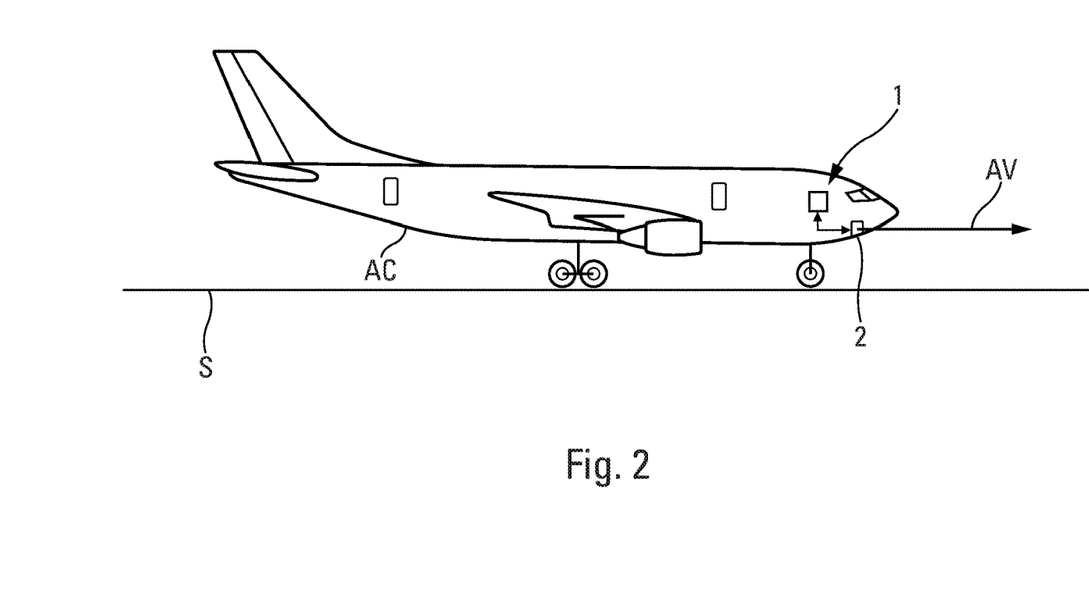
FIG. 2 shows an aircraft, namely a transport airplane, provided with such a detection system.

The monitoring sensor 2 which is installed on the aircraft AC is able to generate images of the external environment of the aircraft AC, as represented schematically in FIG. 2 in the example of a rolling camera. This rolling camera provides the pilots with successive images (or video sequences) relating to an exterior view in front of the aircraft AC rolling on the ground S, making it possible especially to aid the pilots while piloting on the ground. The monitoring sensor 2 produces images along a viewing axis AV.

Concerning the monitoring sensor, this may also entail, for example: a radar which provides an image of obstacles or of environmental conditions existing ahead of the aircraft an enhanced vision system, EVS, which comprises an infrared camera and which provides the pilots of the aircraft with an enhanced image of a zone ahead of the aircraft, under degraded visual condition; or any imaging system which provides the pilots with data from monitoring the environment of the aircraft, via images.

The detection system 1 comprises, as represented in FIG. 1, a central unit 3 comprising an analysis unit 4 configured to analyze a plurality of successive images generated by the monitoring sensor 2, with the aim of determining, in at least one first of the images, a position, the so-called real position, of an axis representative of the displacement of the aircraft (the so-called "displacement axis" hereinafter) between the first image and a second image, as specified hereinbelow. Accordingly, this analysis unit 4 is connected, either directly to the monitoring sensor 2 via a link 5 as represented in FIG. 1, or to a means of storage or of use of images which has received the images from the monitoring sensor 2; an acquisition unit "ACQUISITION" 6 (hereinafter "acquisition unit 6") which is configured to acquire from a set 7 of system(s) ("SYSTEM") onboard the aircraft, via a link 8, data relating to the displacement of the aircraft, between an instant of generation of the first image and an instant of generation of the second image; a computation unit "COMPUTATION" 9 (hereinafter "computation unit 9") which is configured to compute, on the basis of these data received via a link 10 of the acquisition unit 6 and of the known positioning of the monitoring sensor 2 on the aircraft, received via a link 11 of a database "DATA BASE" 12 (hereinafter "database 12"), the position in the first image of an axis representative of the displacement of the aircraft (the so-called "displacement axis" hereinafter), the position being termed the theoretical position. The known positioning of the monitoring sensor on the aircraft comprises the position and the orientation of the sighting axis of the monitoring sensor with respect to a benchmark of the aircraft, such as are measured for example during the installation of the monitoring sensor on the aircraft; and an estimation unit "ESTIMATION" 13 (hereinafter "estimation unit 13") which is configured to estimate, if relevant, the angular disparity between the real position (received via a link 14 of the analysis unit 4) of the axis of displacement of the aircraft, and the theoretical position (received via a link 15 of the computation unit 9) of the axis of displacement of the aircraft. This angular disparity, when it is not zero, illustrates a defect of alignment of the monitoring sensor 2.

The first image is generated, in general, chronologically after the second image. It is however also conceivable that the first image be generated chronologically before the second image.

Moreover, by "instant of generation of an image" is meant the moment (or the instant) at which the monitoring sensor generates (or takes) this image.

The central unit 3 of the detection system 1 also comprises a comparison unit "COMPARISON" 16 (hereinafter "comparison unit 16") configured to compare this angular disparity (received via a link 17 of the estimation unit 13) with at least one predefined value representing a tolerance (received from a database "DATA BASE" 25 (hereinafter "database 25") via a link 26) so as to detect a misalignment when this angular disparity is greater than the predefined value. As long as the angular disparity is less than or equal to this predefined value, it is considered that the alignment defect (although existing) lies within the tolerance and that no misalignment is detected by the detection system 1.

Upon the detection of a misalignment, the corresponding item of information can be transmitted, via a link 18, to at least one system 19 ("ALERT") of the aircraft, especially an alert means for example of audible type and/or of visual type, which forewarns a crew member of the misalignment.

Thus, the detection system 1 is able to detect effectively and automatically during operation, that is to say while the aircraft is operational, during a flight or when rolling on the ground S (as represented in FIG. 2), the misalignment of the monitoring sensor 2, doing so on the basis of the analysis of images generated by this monitoring sensor 2 and of data provided by one or more onboard systems of a set 7, and to forewarn the crew of the aircraft upon such a detection.

The set 7 making it possible to provide data relating to the displacement of the aircraft, to the acquisition unit 6, comprises, for example, at least one of the following elements or systems of the aircraft: an air data inertial and reference system, ADIRS; a positioning system, for example of GPS ("Global Positioning System") type; any onboard means or computer which employs data relating to the displacement of the aircraft.

The acquisition unit 6 can also receive the information to be processed from several of the aforementioned systems or elements, forming part of the set 7.

The acquisition unit 6 is therefore configured to acquire data relating to the displacement of the aircraft. This displacement of the aircraft includes the displacement of the aircraft along a trajectory, as well as of the aircraft's attitude modifications (rotation about its three axes).

Furthermore, in a particular embodiment, as considered in the following description, the displacement of the aircraft is measured with respect to the ground. In a variant embodiment, it can also be measured with respect to another fixed element and especially with respect to an air mass surrounding the aircraft, for example in the case where the monitoring sensor is a meteorological radar.

In a preferred embodiment, the detection system 1 comprises a transmission unit (link 20) for transmitting to at least one user system "USER" 21 (hereinafter "user system 21"), the angular disparity estimated by the estimation unit 13 (or provided by the comparison unit 16). This angular disparity makes it possible to quantify, if relevant, the misalignment of the monitoring sensor 2.

The misalignment quantification thus obtained may be used to automatically realign the monitoring sensor 2 if the latter employs an electronic pointing system (automatic or manual), doing so via an appropriate realignment means representing a user system 21.

The detection of a misalignment of the monitoring sensor is obtained by a comparison between the displacement of the aircraft, deduced from the analysis of the motions between a succession of images provided by the monitoring sensor 2 whose alignment it is desired to verify; and the displacement of the aircraft, provided by systems for positioning of the aircraft, for example of ADIRS type, while taking into account the relative position, which is recorded in the database 12, of the monitoring sensor with respect to a center of displacement of the aircraft (generally the center of gravity).

In a preferred embodiment, the analysis unit 4 comprises a motion detection element "DETECTION" 22 (hereinafter "motion detection element 22") comprising the following integrated processing elements: a first processing element for analyzing the images generated by the monitoring sensor 2 (and received via the link 5) so as to select characteristic points; a second processing element for analyzing, for each of the characteristic points, the images so as to determine the motion of each of these characteristic points; and a third processing element for separating, for the motion of each of the characteristic points, a first component of the motion, due to a displacement of the aircraft, and a second component of the motion, due to an inherent motion of an element to which the characteristic point belongs; and a computation element "COMPUTATION" 23 (hereinafter "computation element 23") which is connected by way of a link 24 to the motion detection element 22 and which is configured to determine the real position of the axis of displacement of the aircraft, with the aid of the first components of the motion of the characteristic points, received from the third processing element via the link 24. This real position is transmitted by the link 14.

Within the framework of the present embodiment, the motion detection element 22 can implement various standard solutions for extracting motions from a video sequence (or series of successive images). It is possible to cite, by way of illustration, the following types of extraction (or algorithms): by Markov modeling, Markov fields, time average, statistical operator, matching (or "block matching"), Cafforio-Rocca, etc.

The motion detection element 22 can also use standard optimizations of these various algorithms in order to obtain good real-time performance.

Moreover, in order to limit the number of necessary computations, and thus to optimize the CPU (Central Processing Unit) load, the motion detection element 22 is configured to carry out the analysis of the motions not on the entire surface of an image, but on one or more zones of interest of the image, representing a part of the latter. Thus, by way of illustration, in the example of a monitoring sensor corresponding to an enhanced vision system of EVS type, it is not necessary to analyze the sky, the zone of interest being able to correspond in this case to the whole of the viewed image except for the sky.

Furthermore, to limit the number of necessary computations, and thus optimize the CPU load, provision may also be made to: adapt the granularity (motion detection on contour, on cluster, on point of interest SIFT, Harris point of interest, etc.) to the type of image (color, infrared, radar) generated by the monitoring sensor and to the environment seen by the monitoring sensor; if possible, carry out the motion analysis on an image restored in black and white; and reduce the frequency of computing the misalignment. As a function of the monitoring sensor considered, it is not necessary or useful to carry out the detection between each pair of successive images. The analysis of the images, implemented by the analysis unit 4, is then carried out solely for all the n successive images, that is to say for the image I1, then for the image n+1, thereafter for the image 2n+1, . . . , n being an integer greater than 1 and equal for example to 2, 3, . . . .

As indicated hereinabove, the motion detection element 22 can use one of various standard algorithms for extracting the motion of the aircraft.

Figure 3:
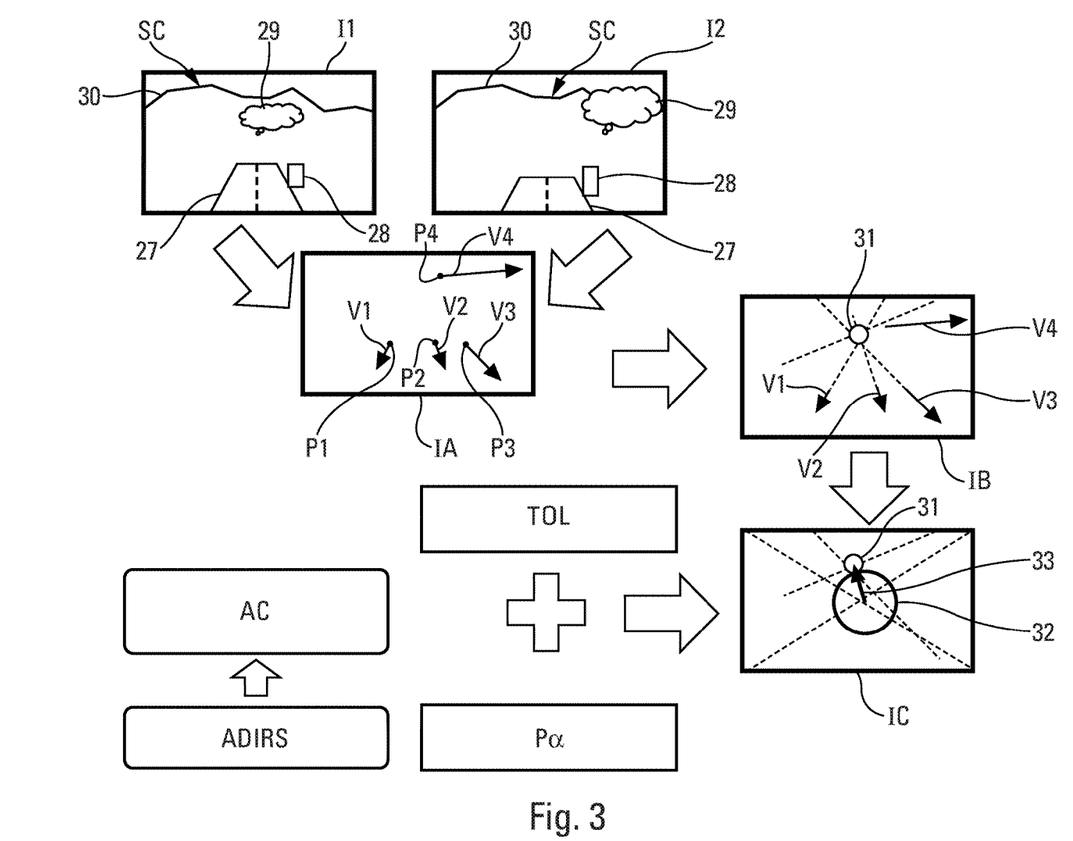
FIG. 3 schematically illustrates an example of determining an angular disparity illustrating a misalignment, with the aid of a focus of expansion.

Thus, in a particular embodiment, this motion detection element 22 uses an extraction implemented on the basis of a focus of expansion of the image, as represented in FIG. 3.

It is known that, during a displacement of an imager (such as the monitoring sensor 2) in a static scene, the directions of velocity of the points projected on the image plane all converge toward a point called the "focus of expansion" (FOE).

Thus, the central unit 3 (FIG. 1) determines for at least one image a so-called real position of a focus of expansion (or real focus of expansion), illustrating the real position of the axis of displacement of the aircraft between two consecutive images, and a so-called theoretical position of the focus of expansion (or theoretical focus of expansion), computed on the basis of data relating to the displacement of the aircraft between the captures of the two consecutive images and of the positioning of the monitoring sensor on the aircraft, illustrating the theoretical position of the axis of displacement of the aircraft, and it estimates the disparity between the real position of the focus of expansion and the theoretical position of the focus of expansion.

In the example of FIG. 3, two successive images I1 and I2 are considered. By way of illustration, these images represent a scene SC captured in front of the aircraft. This scene SC contains especially a landing runway 27 on which the aircraft is rolling, a particular element 28 represented schematically for example a panel, a cloud 29, as well as the relief 30 of the terrain.

The method for measuring the angular disparity on the basis of the images I1 and I2, exhibits the following steps: determine an image IA on which displacement vectors V1 to V4 of the characteristic points P1 to P4 considered are highlighted; determine on the basis of the vectors V1, V2 and V3 the real focus of expansion 31, as illustrated in an image IB of FIG. 3. This real focus of expansion 31 represents the axis of displacement of the aircraft, seen by the monitoring sensor. The vector V4 relates to the cloud 29 which is also subject to an inherent displacement. To be able to take into account the information relating to the vector V4 and delete the inherent displacement of the cloud 29, a filtering is implemented as specified hereinafter on the basis of information arising from one or more onboard systems of the aircraft, namely an ADIRS system in this example, determine the displacement of the aircraft AC with respect to the ground between the instants of generation of the images I1 and I2; with the aid of the displacement of the aircraft AC with respect to the ground, of an adjustment tolerance TOL and of the predetermined angular position Pα of the monitoring sensor, determine the theoretical focus of expansion 32, that is to say the position where the axis of displacement of the aircraft ought to be situated. This position is illustrated in an image IC of FIG. 3, by a circle 32 taking account of the tolerance TOL; and determine the disparity between the two displacement axes, which is highlighted on this image IC by an arrow 33.

Moreover, a filtering is implemented to restore the exterior scene to a static scene, so as to delete the inherent velocities other than that of the monitoring sensor. A simple solution for a monitoring sensor of EVS type or when the inherent motions of the objects are negligible may be to eliminate the directions of the non-convergent velocities within the framework of a focus of expansion FOE based approach.

The central unit 3 can comprise a filter to carry out a temporal filtering. This filter may for example be integrated into the estimation unit 13. This temporal filtering can make it possible to separate a constant misalignment due especially to a definitive deflection of the structure, from a dynamic misalignment due to the motions and vibrations of the structure of the aircraft (which are not necessarily to be taken into account). This temporal filtering can also make it possible to take into account measurement errors of positioning sensors of the aircraft, forming part of the set 7 (FIG. 1).

Moreover, the resolution of the monitoring sensor and the distance to the imaged object having an effect on the measurement accuracy, it is to be integrated into the various computations implemented in the central unit 3.

Figure 4:
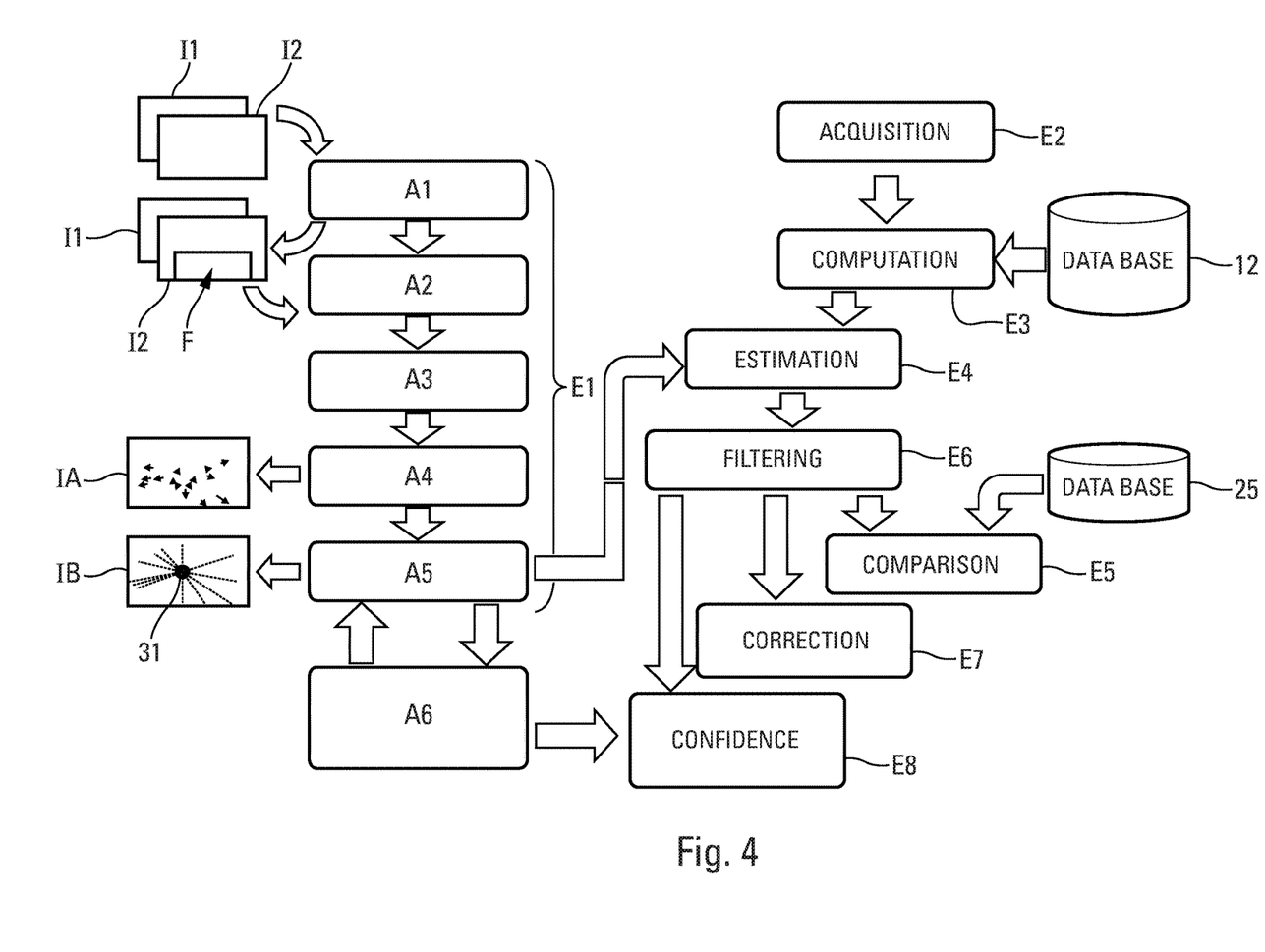
FIG. 4 is the schematic diagram of an example of processing implemented by the detection system.

While it is operational on an aircraft during operation (that is to say during a flight or when rolling on the ground), the detection system 1, such as described hereinabove, implements the following steps, represented in FIG. 4: E1/analyze, via the analysis unit 4, a plurality of successive images I1, I2, . . . , generated by the monitoring sensor so as to determine a position of an axis of displacement of the aircraft in these images, the so-called real position; E2/acquire ("ACQUISITION"), via the acquisition unit 6, at least of a system onboard the aircraft (of the set 7), data relating to the displacement of the aircraft with respect to the ground; E3/compute ("COMPUTATION"), via the computation unit 9, on the basis of these data and of the positioning of the monitoring sensor on the aircraft, arising from the database 12, a position in the images of an axis of displacement of the aircraft, the so-called theoretical position; E4/estimate ("ESTIMATION"), via the estimation unit 13, the angular disparity between the real position and the theoretical position of the axis of displacement of the aircraft; and E5/compare ("COMPARISON"), via the comparison unit 16, this angular disparity with at least one predefined value (or tolerance) so as to detect a misalignment when this angular disparity is greater than the predefined value, received from the database 25.

The method implemented by the detection system 1 also comprises, between steps E4 and E5, a filtering step E6 ("FILTERING"), to confirm the existence of a constant misalignment. Moreover, the analysis step E1 comprises the following sub-steps A1 to A5: A1/define the zone or zones of interest F (dynamic or static) of the images I1, I2; A2/select the characteristic points (or points of interest) on the zone or zones of interest F; A3/pair the characteristic points between the images; A4/compute the trajectories of the points of interest (image IA); and A5/compute the position of the real focus of expansion 31 (image IB).

It is possible to provide an additional sub-step A6 of deleting the trajectories which are not that of the aircraft (and diverge with respect to the average).

The method implemented by the detection system 1 can also comprise a step E7 of displacing the acquired image so as to implement a correction ("CORRECTION") of a misalignment, with the aid of an appropriate user system 21 (FIG. 1); and a step E8 of computing a confidence rating ("CONFIDENCE") as a function of the number of convergent points and of the evolution of the error.

Accordingly, the central unit 3 can comprise a computation element (which is for example integrated into the estimation unit 13) for determining a confidence rating for the value of the estimated angular disparity. This confidence rating can be deduced from the evolution over time of the misalignment which, after filtering of the dynamic deformations of structures, must be constant (and evolve solely at the moment of the event, for example an impact, which causes its occurrence); and from the number of points that are usable to compute the displacement of the aircraft. The higher the number of convergent points, the better the confidence rating and the accuracy.

The detection system 1, such as described hereinabove, makes it possible to carry out automatic detection of the misalignment of a monitoring sensor, while being implemented through software, and while not requiring any specific extra hardware, doing so by providing an appropriate algorithm, as described hereinabove. The detection system 1 can thus be implemented on systems existing on the aircraft and having sufficient availabilities in terms of interface and resources of processors.

While at least one exemplary embodiment of the present embodiments (s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for automatically detecting a misalignment during operation of a monitoring sensor built into an aircraft, the monitoring sensor being able to generate images of the external environment of the aircraft, the method comprising:
    a) analyzing a plurality of successive images generated by the monitoring sensor so as to determine a real position in a first image of an axis representative of the displacement of the aircraft between the first image and a second image;
    b) acquiring from at least one system onboard the aircraft, displacement data relating to the displacement of the aircraft between an instant of generation of the first image and an instant of generation of the second image, wherein the displacement data is acquired independent of the plurality of successive images;
    c) computing on the basis of the displacement data and of the positioning of the monitoring sensor on the aircraft, a theoretical position in the first image of the axis representative of the displacement of the aircraft;
    d) estimating an angular disparity between the real position and the theoretical position of the axis representative of the displacement of the aircraft;
    e) comparing the angular disparity with a predefined value so as to detect a misalignment when the angular disparity is greater than the predefined value;
    f) determining a confidence rating of the angular disparity estimated in step d);
    g) transmitting the angular disparity estimated in step d) to at least one user system.

2. The method of claim 1, further comprising:
analyzing the images generated by the monitoring sensor so as to select characteristic points;
    for each of the selected characteristic points, analyzing the images so as to determine the motion of each of these characteristic points;
    for the motion of each of the characteristic points, separating a first component of the motion, due to a displacement of the aircraft, from a second component of the motion, due to an inherent motion of an element to which the characteristic point belongs; and
    determining the real position of the axis representative of the displacement of the aircraft with the aid of the first components of the motion of the characteristic points.

3. The method of claim 1, wherein the analysis of the images, implemented in step a), is limited to at least one zone of interest of the images.

4. The method of claim 1, wherein the analysis of the images, implemented in step a), is carried for n successive images, n being an integer greater than 1.

5. The method of claim 1,
    wherein step a) comprises determining a real position of a focus of expansion, and illustrating the real position of the axis representative of the displacement of the aircraft, and
    step c) comprises determining a theoretical position of the focus of expansion, illustrating the theoretical position of the axis representative of the displacement of the aircraft, and
    step d) comprises estimating the disparity between the real position of the focus of expansion and the theoretical position of the focus of expansion.

6. The method of claim 1,
    wherein the step of determining the confidence rating of the angular disparity, comprises deducing the confidence rating:
    from the evolution, over time, of the misalignment; and
    from a number of points that are usable to compute the displacement of the aircraft.

7. The method of claim 1, comprising temporal filtering of the angular disparity estimated in step d).

8. The method of claim 1, further comprising transmitting an item of information relating to a misalignment detected in step e) to at least one user system.

9. A detection system for automatically detecting a misalignment during operation of a monitoring sensor built into an aircraft, the monitoring sensor being able to generate images of an external environment of the aircraft, the detection system comprising a processor and a non-transitory computer readable medium having processor-executable instructions for reading data from the processor in communication with the monitoring sensor, the processor-executable instructions when executed on the processor configure the detection system to:
    analyze a plurality of successive images generated by the monitoring sensor so as to determine a real position in a first image of an axis representative of the displacement of the aircraft between the first image and a second image;
    acquire from at least one system onboard the aircraft, displacement data relating to the displacement of the aircraft between an instant of generation of the first image and an instant of generation of the second image, wherein the displacement data is acquired independent of the plurality of successive images;
    compute a theoretical position in the first image of the axis representative of the displacement of the aircraft based on the displacement data and the positioning of the monitoring sensor on the aircraft;

estimate an angular disparity between the real position and the theoretical position of the axis representative of the displacement of the aircraft;

compare the angular disparity with a predefined value so as to detect a misalignment when the angular disparity is greater than the predefined value;

determine a confidence rating of the estimated angular disparity;

transmit the angular disparity to at least one user system; and transmit an item of information relating to the misalignment detected to at least one user system.

10. An aircraft, comprising:

a monitoring sensor positioned in the aircraft and operable to generate images of an external environment of the aircraft;

at least one system onboard the aircraft configured to provide displacement data relating to the displacement of the aircraft; and a detection system including a processor and a non-transitory computer readable medium having processor-executable instructions for reading data from a processor in communication with the monitoring sensor, the processor-executable instructions when executed on the processor configure the detection system to:

analyze a plurality of successive images generated by the monitoring sensor so as to determine a real position in a first image of an axis representative of the displacement of the aircraft between the first image and a second image;

acquire displacement data from the at least one system relating to the displacement of the aircraft between an instant of generation of the first image and an instant of generation of the second image, wherein the displacement data is acquired independent of the plurality of successive images;

compute a theoretical position in the first image of the axis representative of the displacement of the aircraft based on the displacement data and the positioning of the monitoring sensor on the aircraft;

estimate an angular disparity between the real position and the theoretical position of the axis representative of the displacement of the aircraft;

compare the angular disparity with a predefined value so as to detect a misalignment when the angular disparity is greater than the predefined value; and determine a confidence rating of the estimated angular disparity.

11. The method of claim 1, wherein the displacement data relating to the displacement of the aircraft between the instant of generation of the first image and the instant of generation of the second image is acquired from an onboard system selected from the group consisting of an air data inertial and reference system, a global positioning system or a combination thereof.

12. The detection system of claim 9, wherein the at least one system onboard the aircraft is selected from the group consisting of an air data inertial and reference system, a global positioning system or a combination thereof.

13. The aircraft of claim 10, wherein the at least one system onboard the aircraft is selected from the group consisting of an air data inertial and reference system, a global positioning system or a combination thereof.

* * * * *